United States Patent
Sorniotti et al.

(10) Patent No.: US 12,316,778 B2
(45) Date of Patent: May 27, 2025

(54) PRIVACY-PRESERVING USER CERTIFICATES

(71) Applicant: International Business Machines Corporation, Armonk, NY (US)

(72) Inventors: Alessandro Sorniotti, Zurich (CH); Elli Androulaki, Zurich (CH); Ilie Circiumaru, Zurich (CH); Jesus Diaz Vico, Madrid (ES); Marko Vukolić, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/653,117

(22) Filed: Mar. 1, 2022

(65) Prior Publication Data

US 2023/0283484 A1    Sep. 7, 2023

(51) Int. Cl.
G06F 21/00 (2013.01)
G06F 21/36 (2013.01)
G06F 21/62 (2013.01)
H04L 9/32 (2006.01)
H04L 29/06 (2006.01)

(52) U.S. Cl.
CPC ............ H04L 9/3263 (2013.01); G06F 21/36 (2013.01); G06F 21/6245 (2013.01); H04L 9/3236 (2013.01); H04L 9/3247 (2013.01)

(58) Field of Classification Search
CPC ... G06F 21/36; G06F 21/6245; H04L 9/3236; H04L 9/3263
See application file for complete search history.

(56) References Cited

U.S. PATENT DOCUMENTS

| 9,094,379 | B1  |   | 7/2015  | Miller |
| 2011/0119400 | A1 | * | 5/2011  | Manion ................... H04L 45/54 709/242 |
| 2013/0276084 | A1 | * | 10/2013 | Canard ................ H04L 9/3218 726/7 |
| 2014/0254796 | A1 | * | 9/2014  | Li ......................... H04L 9/3263 380/246 |
| 2015/0082387 | A1 | * | 3/2015  | Ciancio-Bunch ....... H04L 63/10 726/4 |
| 2019/0192977 | A1 | * | 6/2019  | Eatedali .................. A63F 13/35 |
| 2020/0372507 | A1 | * | 11/2020 | Liu ..................... G06Q 20/3274 |
| 2021/0152364 | A1 | * | 5/2021  | Beecham ................. G06F 16/27 |
| 2022/0393883 | A1 | * | 12/2022 | Panchamia ....... G06Q 20/38215 |

OTHER PUBLICATIONS

Jose Rouillard, Contextual QR Codes, 2008, IEEE, pp. 50-54 (Year: 2008).*
Salahuddin Ahamed, A Secure QR Code System for Sharing Personal Confidential Information, 2019, IEEE, pp. 1-4 (Year: 2019).*

(Continued)

*Primary Examiner* — Rodman Alexander Mahmoudi
(74) *Attorney, Agent, or Firm* — Kelsey Skodje

(57) ABSTRACT

A method, system, and computer program product are disclosed. The method includes separating a user certificate into a private component and a non-private component. The method further includes storing the non-private component in a database and providing a pointer to the non-private component stored in the database.

20 Claims, 7 Drawing Sheets

(56) References Cited

OTHER PUBLICATIONS

Ahamed et al., "A Secure QR Code System for Sharing Personal Confidential Information," https://www.researchgate.net/profile/Hossen-Mustafa/publication/339975365, International Conference on Computer, Communication, Chemical, Materials and Electronic Engineering (IC4ME2), Jul. 11-12, 2019, 5 pgs.
Buch, H., "Establishing blockchain privacy through Zero Knowledge Proof," https://www.wipro.com/blogs/hitarshi-buch/establishing-blockchain-privacy-through-zero-knowledge-proof/, Jun. 2019, 10 pgs.
Chuang et al., "A Novel Secret Sharing Technique Using QR Code," https://www.researchgate.net/publication/49603949, International Journal of Image Processing (IJIP), vol. (4): Issue (5), 9 pgs.
Ilaiyaraja et al., "Secured Message Transfer through QR Code Process for Document Authentication Systems," https://www.researchgate.net/publication/331646269, International Journal of Emerging Technology in Computer Science & Electronics (IJETCSE), ISSN: 0976-1353, Vole 24, Issue 10, Jul. 2017, 6 pgs.
Mell et al., "The NIST Definition of Cloud Computing," Recommendations of the National Institute of Standards and Technology, U.S. Department of Commerce, Special Publication 800-145, Sep. 2011, 7 pgs.
Rouillard, J., "Contextual QR Codes," https://www.researchgate.net/publication/4362876, Conference Paper, Jul. 2008, 7 pgs.

* cited by examiner

PRIVACY-PRESERVING USER CERTIFICATES

BACKGROUND

The present disclosure relates to digital certificates in barcodes and, more specifically, to issuing and managing user certificates in a privacy-preserving manner.

Quick response (QR) codes and other barcodes can be used to store digital certificates in printed form or in mobile wallets. For example, end users can obtain digitally-signed assertions (e.g., a ticket, a health certificate, or an identification card) from issuers as QR codes, which can then be shown to digital readers (e.g., a digital verifier). Systems may be designed so that once such an assertion is issued, the issuer immediately destroys every copy of it by design.

SUMMARY

Various embodiments are directed to a method, which includes separating a user certificate into a private component and a non-private component. The method further includes storing the non-private component in a database and providing a pointer to the non-private component stored in the database.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
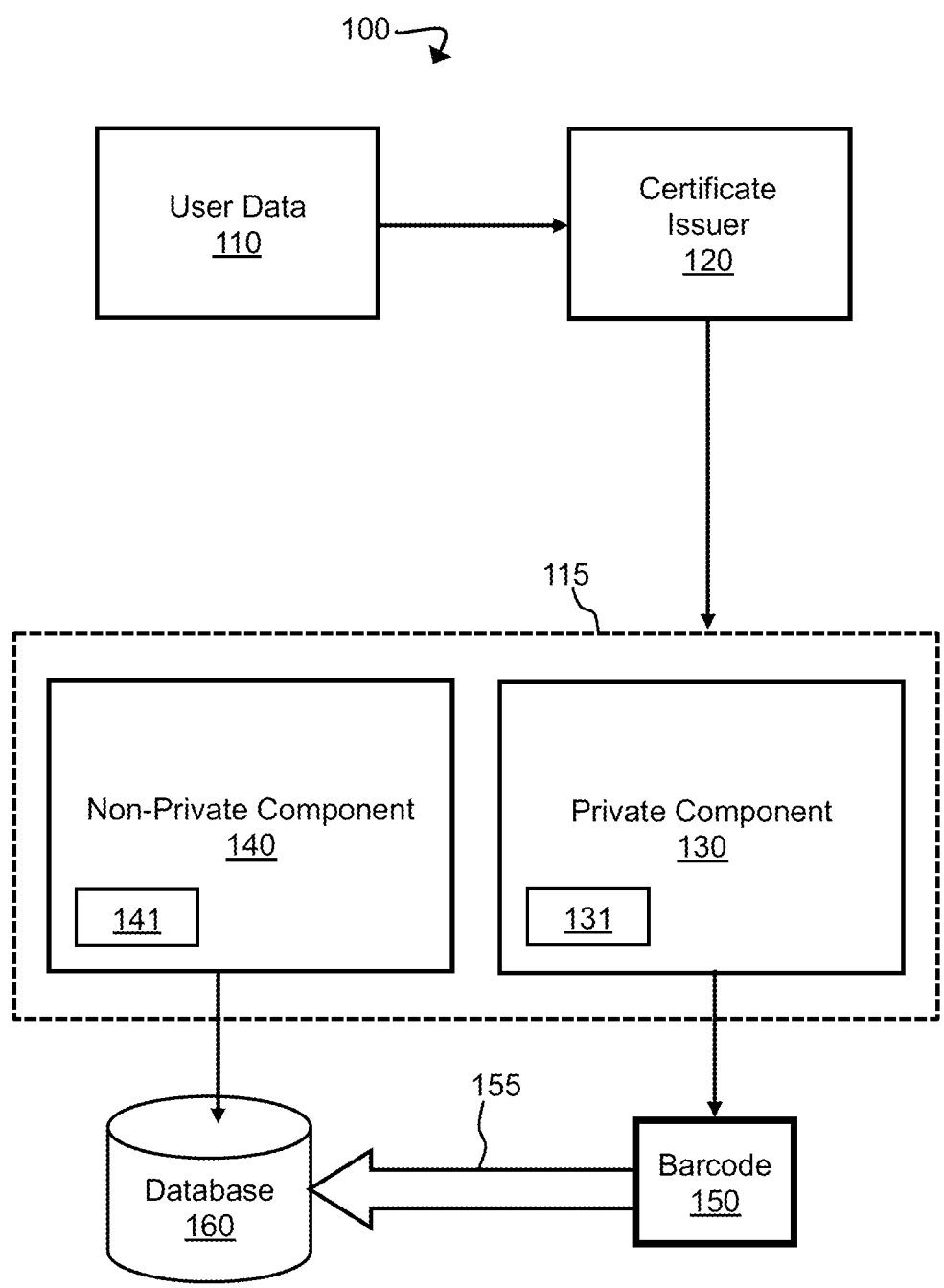
FIG. 1 is a schematic diagram illustrating a certificate-issuing environment, according to some embodiments of the present disclosure.

Aspects of the present disclosure relate generally to the field of digital certificates in barcodes and, more specifically, to issuing and managing user certificates in a privacy-preserving manner. While the present disclosure is not necessarily limited to such applications, various aspects of the disclosure may be appreciated through a discussion of various examples using this context.

Quick response (QR) codes and other barcodes can be used to store digital certificates in printed form, in mobile wallets, or in other digital forms. For example, an end user can obtain a digitally-signed assertion (e.g., a ticket, health certificate, or identification card) from an issuer as a QR code. The QR code can then be shown to a digital reader (e.g., a digital verifier) when the user wishes to provide another party with the encoded information. Systems may be designed so that once such an assertion is issued, the issuer immediately destroys every copy of it by design. This can allow users greater control over the storage of their personal data. However, there can be restrictions on the size of barcodes, which can prevent storage of all fields required for a digitally signed assertion.

Embodiments of the present disclosure may improve techniques for storing digitally-signed assertions securely in barcodes, such as QR codes. In some embodiments, a certificate issuer generates a user certificate containing user data and a digital signature. The issuer can separate data from the user certificate 115 into more than one group. For example, private user data may be stored in a barcode, while non-private user data may be stored in a third party system (e.g., a database). The two groups of data can be linked together and used in a designated context.

It is to be understood that the aforementioned advantages are example advantages and should not be construed as limiting. Embodiments of the present disclosure can contain all, some, or none of the aforementioned advantages while remaining within the spirit and scope of the present disclosure.

Various embodiments are directed to a method that includes separating a user certificate into a private component and a non-private component. The method further includes storing the non-private component in a database and providing a pointer to the non-private component stored in the database. The pointer can be deterministically derived from the private component. For example, the pointer can be derived by means of a cryptographic hash of the private component. In some embodiments, the method includes adding a nonce to the user certificate and computing a digital signature on the user certificate including the nonce. The method can also include encoding the private component as a 2-dimensional barcode, such as a quick response (QR) code. The database can be embodied as a centralized or decentralized storage. In some embodiments, the private component includes data such as personally identifiable information and/or demographics data. The non-private component can include data such as an issuer identity, a digital signature, and/or non-personally identifiable information. Storing the non-private component can include augmenting the non-private component with verification data of a proof system, wherein the proof system is configured to enable a verifier of the user certificate to prove knowledge of at least a subset of the private component corresponding to the pointer. In some embodiments, the pointer can be derived from the private component by a verification device, which submits the pointer to an access software of the database that, in response, provides the non-private component of the user certificate. In these instances, the method can include, by the verification device, producing a proof (e.g., a zero knowledge proof) to demonstrate knowledge of at least a subset of the private component to the access software, which then verifies the proof and provides the non-private component only upon successful verification.

Turning now to the figures, FIG. 1 is a schematic diagram illustrating a certificate-issuing environment 100, according to some embodiments of the present disclosure. Environment 100 can be used to issue certificates for user data 110. The certificates can be provided by a certificate issuer 120, which may be an issuer device such as a server. The issuer 120 can receive the user data 110 and issue a user certificate 115 with the user data 110. The issuer 120 can separate the data of the user certificate 115 into a "private" component 130 and a "non-private" component 140.

The user data 110 may include medical information, such as diagnostic testing information (e.g., AMP Rapid Test SARS-CoV-2 Ag for detecting COVID-19) corresponding to a user. For example, the user data 110 can include the user's first and last name, a date-of-birth (DoB), information identifying the type of diagnostic test performed, the date of the test, the result of the test (e.g., positive or negative), and identifying information for the certificate issuer (e.g., a healthcare provider) 120. Examples of this user data 110 can include the following hypothetical information:

First name: John
Last name: Smith
DoB: 1980 Jan. 1
Diagnostic test: Test A for Virus B
Test date: 14 Apr. 2021
Result: negative
Issuer: Healthcare Provider XY
Issuer ID: 67492f37000a Given this information, the issuer device 120 can generate a cryptographic nonce and compute a digital signature on the user data 110 and the nonce. A user certificate 115 with the user data 110, signature 141, and nonce field 131 can be generated. Continuing the above example, the user certificate 115 can include the following hypothetical information:

First name: John
Last name: Smith
DoB: 1980 Jan. 1
Diagnostic test: Test A for Virus B
Test date: 14 Apr. 2021
Result: negative
Issuer: Healthcare Provider XY
Issuer ID: 67492f37000a
Nonce: 4b48794e
Signature: 4430436163447763 . . . 4a706c776465796c The certificate issuer 120 can separate the information in the certificate 115 into the private component 130 and the non-private component 140. The private component 130 can contain the nonce field 131 and private data from the user data 110 (e.g., demographic information, personal identifying information (PII), etc.). The non-private component 140 can contain the digital signature 141 and data such as the identity of the certificate issuer 120 and/or non-PII data.

In the above example, the private component 130 can include:

First name: John
Last name: Smith
DoB: 1980 Jan. 1
Issuer: Healthcare Provider XY
Issuer ID: 67492f37000a
Nonce: 4b48794e The private component 130 may be provided to the user. The user may store the private component 130 (e.g., on a personal device such as a smartphone). In some embodiments, the private component 130 may be encoded as a barcode 150. This may happen on demand, such as when the user is providing the information in the private component 130 to another party. The barcode 150 may be a 2-dimensional barcode such as a QR-code. In some embodiments, the available area for the barcode may be limited. In other words, the size of the barcode may be limited.

Continuing the above example, the non-private component 140 can include:

Diagnostic test: Test A for Virus B
Test date: 14 Apr. 2021
Result: negative
Signature: 4430436163447763 . . . 4a706c776465796v The non-private component 140 can be stored in a database 160. The barcode 150 can include a pointer or link 155 ("pointer 155") to the non-private component 140 stored in the database 160. For example, the pointer 155 may be a uniform resource locator (URL). In some embodiments, the size of the barcode 150 (e.g., QR code) may be significantly reduced because the non-private component 140 information does not need to be stored in the barcode 150.

The separated information from the certificate 115 can also be referred to as groups of data. For example, groups G1 and G2 can be data from the private 130 and non-private components 140, respectively. In some embodiments, group G2 fulfills as a first requirement that it is substantially impossible to recover any group G1 information from data in group G2. In further embodiments, group G2 fulfills as a second requirement that it is securely bound to data in group G1 such that it is substantially impossible to use data from group G2 in a context different from that which was meant at time of issuance.

The nonce stored in the private component 130 can be advantageous when the private component 130 contains easily guessed information (e.g., data with low entropy).

The pointer 155 may be derived deterministically from the private component 130. In some embodiments, the pointer 155 may be derived by means of a cryptographic hash of the private component 130. For example, when the barcode 150 is presented to a verifier, the verifier may hash the data (group G1) in the barcode 150 by computing equation 1:

$$h = \text{hash}(G1) \quad (1)$$

where hash is a predefined hash-function and h may be used as a lookup key for the database 160.

In some embodiments, the signature 141 stored in the non-private component 140 may be unusable without the private component 130. For example, the (high) entropy of data in the private component 130 can make it computationally unfeasible to find the message for which the signature 141 was generated. The (high) entropy of data in the private component 130 may be provided by the nonce 131 or by the minimum entropy of the source of the data in the private component 130. In some embodiments, the nonce 131 may be omitted when the minimum entropy of the source is sufficiently high.

Environment 100 may optionally be augmented to introduce an access-control feature wherein data of the non-private component 140 is released if and only if the requester of the data is able to prove knowledge of the corresponding data of the private component 130. For example, this may be implemented by zero knowledge (ZK) proof systems. This is described in greater detail below.

In some embodiments, the database 160 may be a centralized or decentralized storage (e.g., a blockchain). According to such an embodiment, the data of the non-private component 140 may be stored by blockchain nodes in a distributed fashion. The access structure to the non-private component 140 may be adapted to a respective threat model. This may involve secret-sharing techniques. As an example, the non-private component 140 may be stored in an encrypted manner by means of a shared secret key, and accordingly the decryption requires the collaboration of all or at least a subset of the nodes. According to embodiments, the blockchain may be configured such that a single honest node requiring a ZK proof can stop any and all attacks. According to an embodiment, the storage of the non-private data in the blockchain may be configured such that a malicious node of the blockchain is only able to provide a part of the non-private data. Such blockchain embodiments may prevent zero knowledge proofs being dispensed with by a colluding 3rd party server/system.

Figure 2:
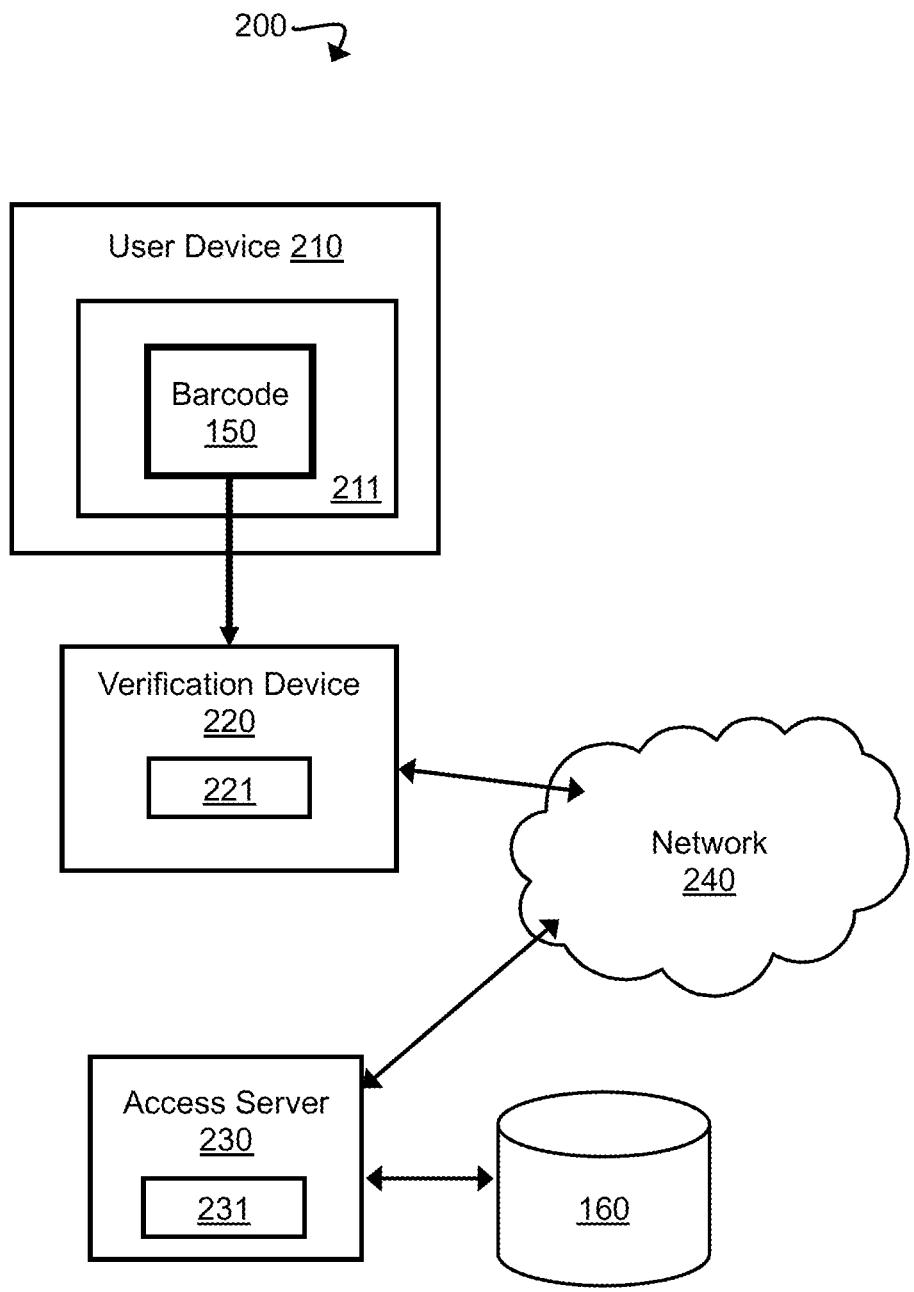
FIG. 2 is a schematic diagram illustrating a certificate-verification environment, according to some embodiments of the present disclosure.

FIG. 2 is a schematic diagram illustrating a certificate-verification environment 200, according to some embodiments of the present disclosure. Environment 200 can verify the barcode 150 as issued by the certificate-issuing environment 100 discussed with respect to FIG. 1. Environment 200 includes a user device 210 that is configured to run a user software 211. The user device 210 may be operated by a user, in particular by a user who has received the barcode 150 from the certificate issuer 120. The barcode 150 may be stored by the user software 211 and presented to a verifier on demand.

Environment 200 also includes a verification device 220, which can run a verification software 221. The verification software 221 can perform a verification of the user certificate 115 corresponding to the barcode 150. The verification device 220 may be, for example, a device of a ticket inspector, such as a mobile computing device, a laptop computer, a desktop computer, etc.

Environment 200 further includes a third-party server 230, which is also referred to as an "access server" herein. The access server 230 is coupled to the database 160 and can manage and store the non-private data of user certificates (e.g., user certificate 115) in the database 160. The access server 230 can run an access software 231. The verification device 220 and the access server 230 may be coupled to each other by means of a network 240 (e.g., the internet) and may communicate and exchange messages with each other via the network 240.

The verification device 220 may receive the barcode 150 by, for example, scanning the barcode 150 from a display/user interface of the user device 210. The verification device 220, using the verification software 221, may derive the pointer 155 from the barcode 150, (e.g., by applying a hash function).

The verification device 220 may then submit the pointer 155 via the network 240 to the access software 231 of the access server 230. Then, the access server 230 may retrieve the corresponding data of the non-private component 140 of the user certificate 115 from the database 160 and provide the non-private data of the user certificate 115 via the network 240 to the verification software 221.

Figure 3:
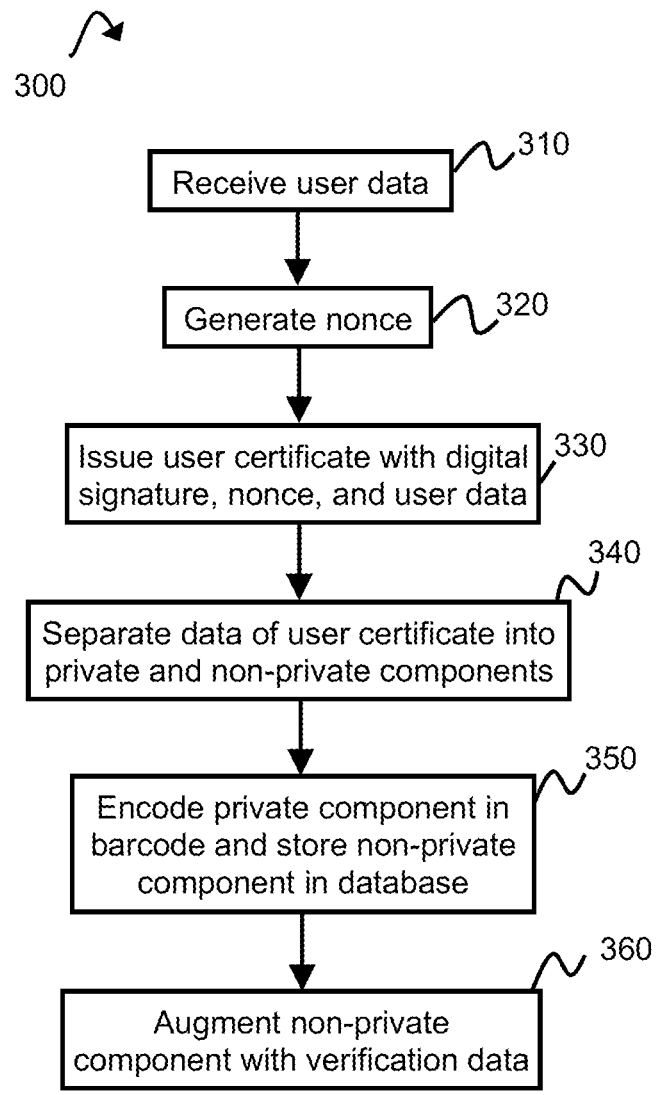
FIG. 3 is a flow diagram illustrating a process of issuing a user certificate, according to some embodiments of the present disclosure.

FIG. 3 is a flow diagram illustrating a process 300 of issuing a user certificate 115, according to some embodiments of the present disclosure. To illustrate process 300, but not to limit embodiments, FIG. 3 is described within the context of environment 100 illustrated in FIG. 1.

The certificate issuer 120 receives the user data 110 for the certificate 115. This is illustrated at operation 310. The user data 110 includes private data. The issuer 120 can then generate a nonce. This is illustrated at operation 320. The nonce can be generated using, for example, a pseudo-random number generator (PRNG) to fill the nonce field 131 of the user certificate 115 to an appropriate length as determined above. The PRNG can be cryptographically secure. The issuer 120 generates the user certificate 115. This is illustrated at operation 330. Generating the certificate 115 can include computing a digital signature 141 on the user data 110 and the nonce 131. The certificate 115 can include user data 110, the nonce 131, and the signature 141.

The certificate issuer 120 separates the user certificate 115 data into a private component 130 and a non-private component 140. This is illustrated at operation 340. The separation can be carried out according to a predefined categorization. A tradeoff may be determined in order to obtain a barcode with a sufficiently small size while ensuring that the non-private data is privacy-friendly. For example, there can be non-PII or non-confidential user data 110, such as blood type, that may be included in the private component 130 if there is a large enough area for the barcode 150. In addition, an estimate of the minimum entropy of the private data may be determined to size the nonce field 131 in the private component 130.

The certificate issuer 120 encodes the private component 130 in a barcode 150 and stores the non-private component 140 in the database 160. This is illustrated at operation 350. The issuer 120 also provides a pointer 155 to the database 160. For example, the pointer 155 can be provided to the third-party server 230 managing the database 160 from which the non-private component 140 shall be retrieved or be accessible. In some embodiments, such a pointer 155 may be provided using a hash function. For example, if the private component 130 includes private data in group G1. The barcode 150 can be issued for the private component 130 data (group G1). A pointer h may then be computed as a hash function hash from G1 using equation 1 (see above). The data of the non-private component 140 can then be stored in the database 160 indexed by the pointer h.

The data of the non-private component 140 may optionally be augmented to store verification data that can be used by a proof system. This is illustrated at operation 360. The verification data may enable a proof to prove knowledge of data of the private component 130 (G1) associated with the record of the non-private component 140 stored at/under the pointer h. Given a set of user information m from the private component 130, the certificate issuer 120 may generate a random string r and store hash functions H shown in equations 2 and 3:

$$h = H(m) \quad (2)$$

$$h' = H(m, r) \quad (3)$$

In these instances, if a verifier sends $h=H(m)$ to the issuer 120, the issuer 120 sends back r. The verifier must then reply with h'. Verification is discussed in greater detail with respect to FIGS. 2 and 4.

In other embodiments, operation 360 is omitted from process 300. For example, a zero-knowledge proof may be used to prove knowledge of data of the private component 130. In these instances, no augmentation is needed.

Figure 4:
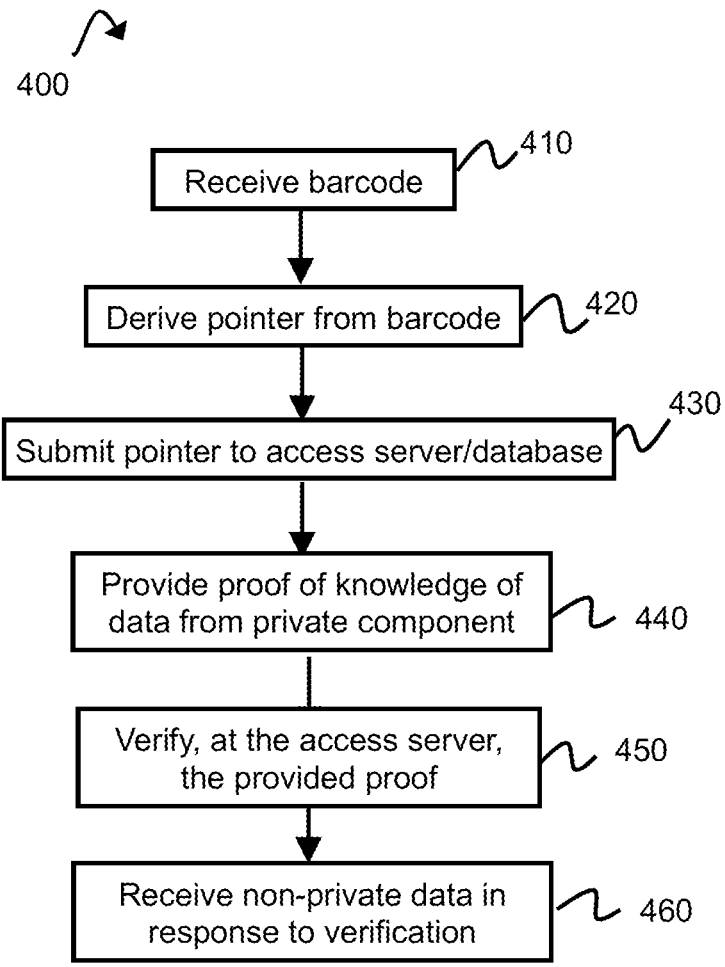
FIG. 4 is a flow diagram illustrating a process of verifying a user certificate, according to some embodiments of the present disclosure.

FIG. 4 is a flow diagram illustrating a process of verifying a user certificate, according to some embodiments of the present disclosure. To illustrate process 400, but not to limit embodiments, FIG. 4 is described within the context of environments 100 and 200 illustrated in FIGS. 1 and 2.

The verification device 220 receives the barcode 150. This is illustrated at operation 410. The barcode 150 may be, for example, presented by a user on a user device 210, such as a smartphone or other mobile computing device. The verification device 220 may receive the barcode 150 by scanning the barcode.

The verification device 220 then derives a pointer 155 from the barcode 150. This is illustrated at operation 420. For example, the pointer 155 can be derived by applying a hash function on the private data encoded in the barcode 150. The verification device 220 submits the pointer 155 to an access software 231 of the database 160, such as access software 231 running on a third party server 230 coupled to the database 160. This is illustrated at operation 430.

The verification device 220 produces a proof to demonstrate to the access software 231 knowledge of at least a subset of the private component 130 of the user certificate 115. This is illustrated at operation 440. The access software 231 then performs a verification of the proof. This is illustrated at operation 450. In some embodiments, operations 440 and 450 may be carried out as an interactive zero-knowledge proof. Such an interactive zero-knowledge proof may encompass messages to be exchanged between the verification device 220 and the access software 231. For example, an algorithm based on an additional secret and hash may be used. The access software 231 provides the non-private data of the user certificate 115 only upon successful verification of the proof. This is illustrated at operation 460. As a result, the full certificate 115 can be made available to the verification device 220 for verification.

Figure 5:
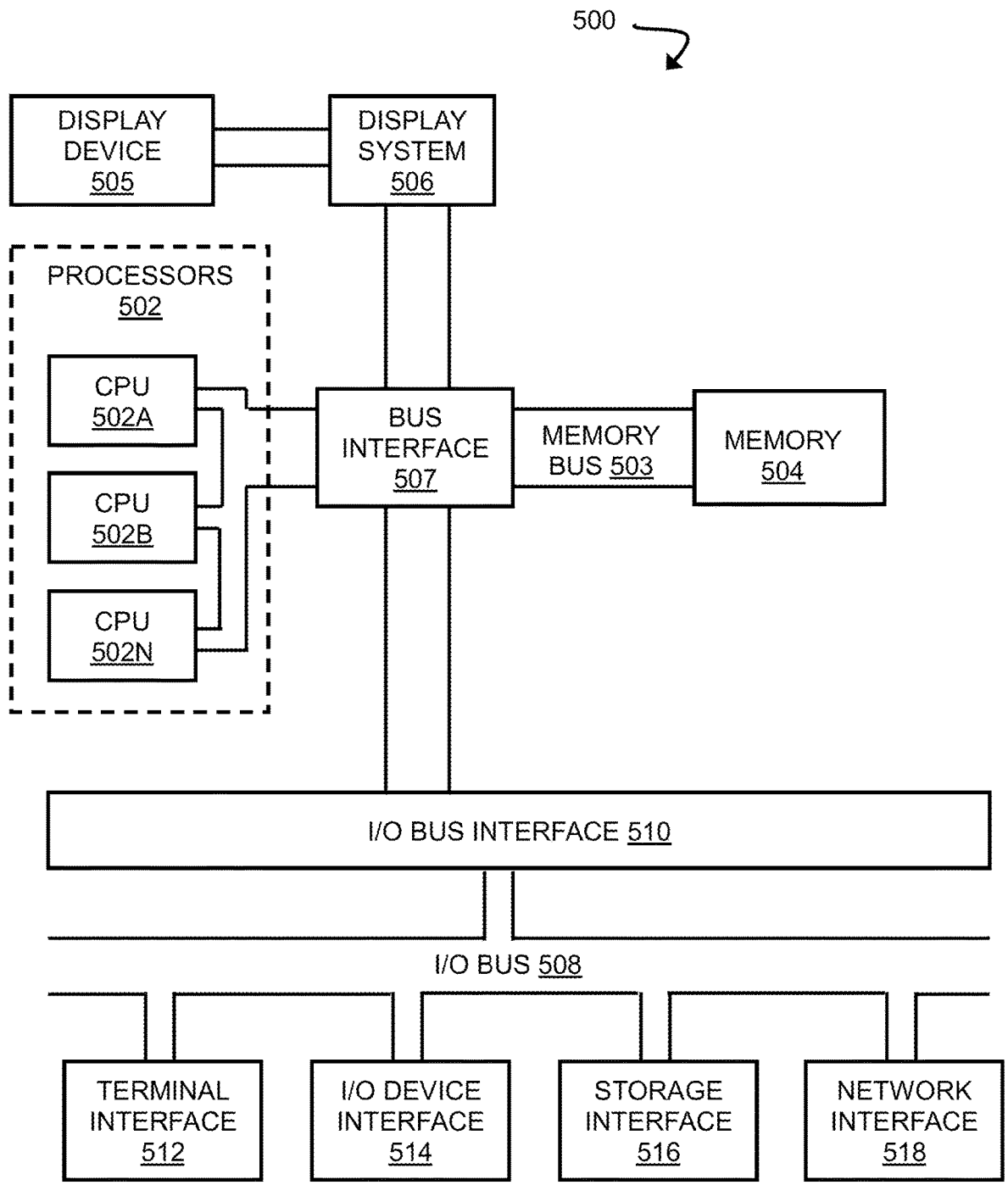
FIG. 5 is a block diagram illustrating a computer system, according to some embodiments of the present disclosure.

FIG. 5 is a block diagram illustrating an exemplary computer system 500 that can be used in implementing one or more of the methods, tools, components, and any related functions described herein (e.g., using one or more processor circuits or computer processors of the computer). In some embodiments, the major components of the computer system 500 comprise one or more processors 502, a memory subsystem 504, a terminal interface 512, a storage interface 516, an input/output device interface 514, and a network interface 518, all of which can be communicatively coupled, directly or indirectly, for inter-component communication via a memory bus 503, an input/output bus 508, bus interface unit 507, and an input/output bus interface unit 510.

The computer system 500 contains one or more general-purpose programmable central processing units (CPUs) 502A, 502B, and 502-N, herein collectively referred to as the CPU 502. In some embodiments, the computer system 500 contains multiple processors typical of a relatively large system; however, in other embodiments the computer system 500 can alternatively be a single CPU system. Each CPU 502 may execute instructions stored in the memory subsystem 504 and can include one or more levels of on-board cache.

The memory 504 can include a random-access semiconductor memory, storage device, or storage medium (either volatile or non-volatile) for storing or encoding data and programs. In some embodiments, the memory 504 represents the entire virtual memory of the computer system 500 and may also include the virtual memory of other computer systems coupled to the computer system 500 or connected via a network. The memory 504 is conceptually a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

Components of environments 100 and/or 200 (FIGS. 1 and 2), can be included within the memory 504 in the computer system 500. However, in other embodiments, some or all of these components may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, components of the memory 504 are not necessarily all completely contained in the same storage device at the same time. Further, although these components are illustrated as being separate entities, in other embodiments some of these components, portions of some of these components, or all of these components may be packaged together.

In an embodiment, components of environments 100 and/or 200 include instructions that execute on the processor 502 or instructions that are interpreted by instructions that execute on the processor 502 to carry out the functions as further described in this disclosure. In another embodiment, the components of environments 100 and 200 are implemented in hardware via semiconductor devices, chips, logical gates, circuits, circuit cards, and/or other physical hardware devices in lieu of, or in addition to, a processor-based system. In another embodiment, the components of environments 100 and 200 include data in addition to instructions.

Although the memory bus 503 is shown in FIG. 5 as a single bus structure providing a direct communication path among the CPUs 502, the memory subsystem 504, the display system 506, the bus interface 507, and the input/output bus interface 510, the memory bus 503 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 510 and the input/output bus 508 are shown as single respective units, the computer system 500 may, in some embodiments, contain multiple input/output bus interface units 510, multiple input/output buses 508, or both. Further, while multiple input/output interface units are shown, which separate the input/output bus 508 from various communications paths running to the various input/output devices, in other embodiments some or all of the input/output devices may be connected directly to one or more system input/output buses.

The computer system 500 may include a bus interface unit 507 to handle communications among the processor 502, the memory 504, a display system 506, and the input/output bus interface unit 510. The input/output bus interface unit 510 may be coupled with the input/output bus 508 for transferring data to and from the various input/output units. The input/output bus interface unit 510 communicates with multiple input/output interface units 512, 514, 516, and 518, which are also known as input/output processors (IOPs) or input/output adapters (IOAs), through the input/output bus 508. The display system 506 may include a display controller. The display controller may provide visual, audio, or both types of data to a display device 505. The display system 506 may be coupled with a display device 505, such as a standalone display screen, computer monitor, television, or a tablet or handheld device display. In alternate embodiments, one or more of the functions provided by the display system 506 may be on board a processor 502 integrated circuit. In addition, one or more of the functions provided by the bus interface unit 507 may be on board a processor 502 integrated circuit.

In some embodiments, the computer system 500 is a multi-user mainframe computer system, a single-user system, or a server computer or similar device that has little or no direct user interface but receives requests from other computer systems (clients). Further, in some embodiments, the computer system 500 is implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, Components other than or in addition to those shown in FIG. 5 may be present, and the number, type, and configuration of such components may vary.

In some embodiments, the data storage and retrieval processes described herein could be implemented in a cloud computing environment, which is described below with respect to FIGS. 6 and 7. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
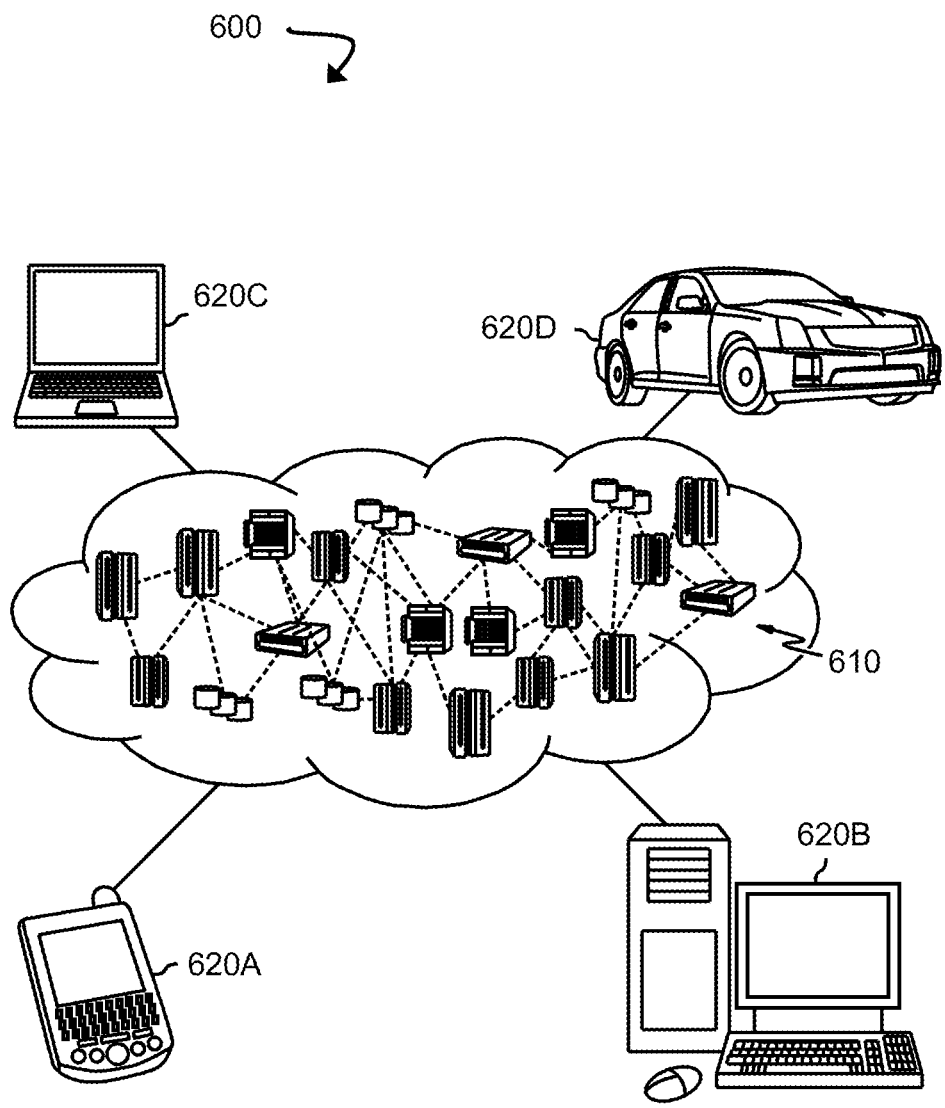
FIG. 6 is a block diagram illustrating a cloud computing environment, according to some embodiments of the present disclosure.

FIG. 6 is a block diagram illustrating a cloud computing environment 600, according to some embodiments of the present disclosure. As shown, cloud computing environment 600 includes one or more cloud computing nodes 610 with which local computing devices used by cloud consumers, such as, for example, personal digital assistant (PDA) or cellular telephone 620A, desktop computer 620B, laptop computer 620C, and/or automobile computer system 620D may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620A-620D shown in FIG. 4 are intended to be illustrative only and that computing nodes 610 and cloud computing environment 600 can communicate with any type of computerized device over any type of network and/or network addressable connection (e.g., using a web browser).

Figure 7:
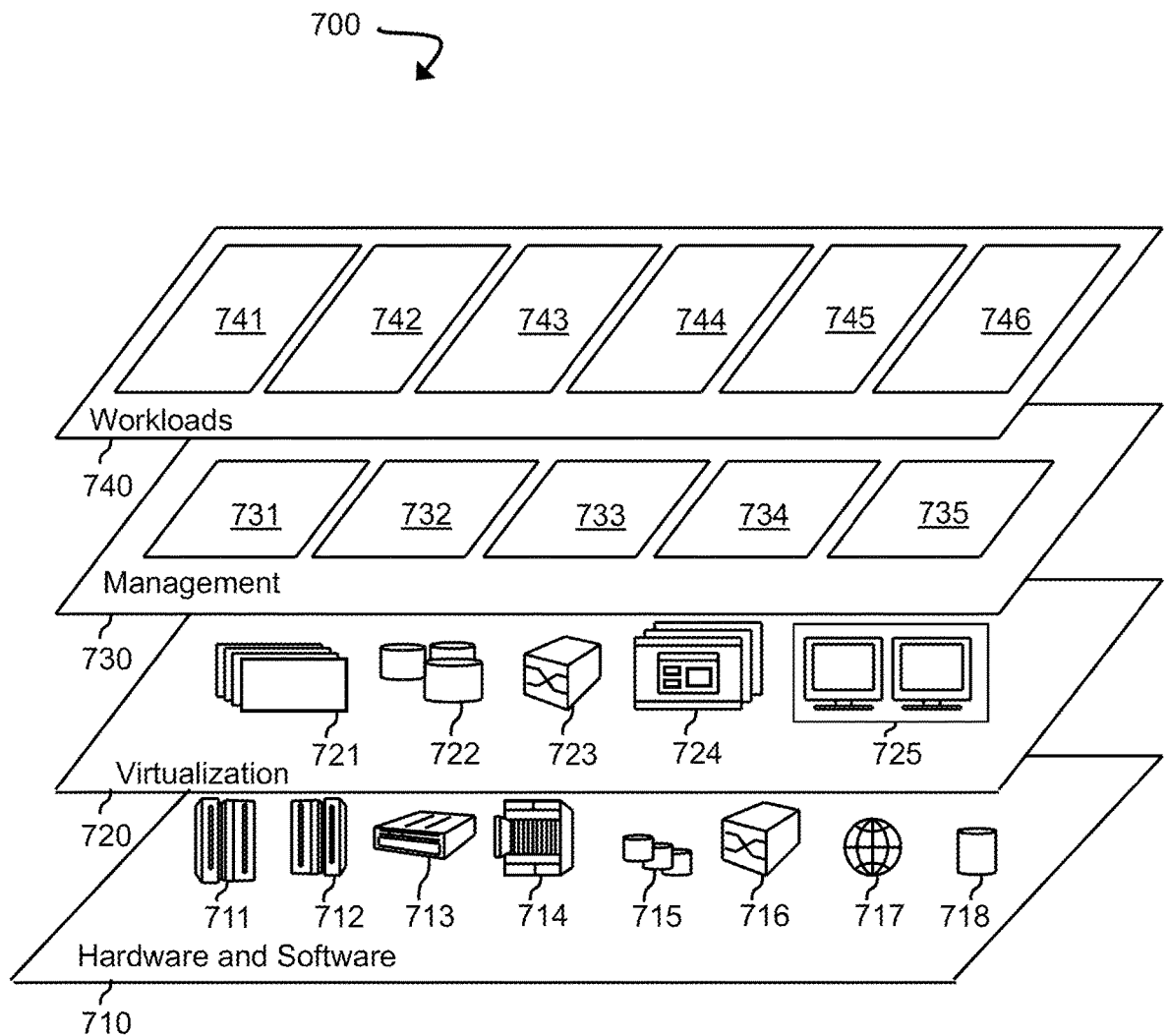
FIG. 7 is a block diagram illustrating a set of functional abstraction model layers provided by the cloud computing environment, according to some embodiments of the present disclosure.

FIG. 7 is a block diagram illustrating a set of functional abstraction model layers 700 provided by the cloud computing environment 600, according to some embodiments of the present disclosure. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 provides the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment can be utilized. Examples of workloads and functions that can be provided from this layer include: mapping and navigation 741; software development and lifecycle management 742; virtual classroom education delivery 743; data analytics processing 744; transaction processing 745; and issuing and/or verifying user certificates 746.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
issuing a digitally-signed assertion, the issuing comprising:
receiving user data;
separating the user data into a private component and a non-private component, wherein the separating comprises:
determining, based on a size of an area, an amount of the user data that can be encoded in the area; and
selecting, from the user data, data for the private component based on the determined amount and a categorization of the user data;
encoding the private component and a nonce in the area as a barcode;
separately from the barcode, storing the non-private component and a digital signature in a database; and
generating a user certificate comprising the barcode and a pointer to the non-private component in the database.

2. The method of claim 1, wherein the issuing further comprises deriving the pointer deterministically from the private component.

3. The method of claim 2, wherein the pointer is derived by means of a cryptographic hash of the private component.

4. The method of claim 1, wherein the barcode is a 2-dimensional barcode.

5. The method of claim 1, wherein the database is embodied as a centralized storage or a decentralized storage.

6. The method of claim 1, wherein the private component comprises data selected from the group consisting of personally identifiable information and demographics data.

7. The method of claim 1, wherein the non-private component comprises data selected from the group consisting of an issuer identity, and non-personally identifiable information.

8. The method of claim 1, the issuing further comprising augmenting the non-private component with verification data of a proof system, wherein the proof system is configured to enable a verifier of the user certificate to prove knowledge of at least a subset of the private component corresponding to the pointer.

9. The method of claim 1, wherein the pointer can be derived from the private component by a verification device, and wherein the verification device can submit the pointer to an access software that, in response, provides the non-private component.

10. The method of claim 9, wherein the access software provides the non-private component only upon verification of a proof demonstrating knowledge of at least a subset of the private component.

11. The method of claim 10, wherein the proof comprises a zero-knowledge proof.

12. The method of claim 1, wherein the categorization of the user data is based on whether or not the data is personal identifying information.

13. The method of claim 1, wherein the issuing further comprises:
estimating a minimum entropy of the data selected for the private component; and
determining a size of a nonce field for the nonce in the private component based on the minimum entropy.

14. The method of claim 1, wherein the issuing further comprises computing the digital signature based on the user data and the nonce.

15. A system, comprising:
a memory; and
a processor communicatively coupled to the memory, wherein the processor is configured to perform a method of issuing a digitally-signed assertion, the method comprising:
receiving user data;
computing a digital signature on the user data and a nonce;
separating the user data into a private component and a non-private component, wherein the separating comprises:
determining, based on a size of an area, an amount of the user data that can be encoded in the area; and
selecting, from the user data, data for the private component based on the determined amount and a categorization of the user data;
encoding the private component and the nonce in the area as a barcode;
separately from the barcode, storing the non-private component and the digital signature in a database; and
generating a user certificate comprising, the barcode and a pointer to the non-private component in the database.

16. The system of claim 15, wherein the storing further comprises augmenting the non-private component with verification data of a proof system, and wherein the proof system is configured to enable a verifier of the user certificate to prove knowledge of at least a subset of the private component corresponding to the pointer.

17. The system of claim 15, wherein the pointer can be derived from the private component by a verification device, and wherein the verification device can submit the pointer to an access software of the database that, in response, provides the non-private component.

18. The system of claim 17, wherein the access software provides the non-private component only upon verification of a proof demonstrating knowledge of at least a subset of the private component.

19. A computer program product, the computer program product comprising a computer readable storage medium having program instructions embodied therewith, the program instructions executable by a processor to cause a device to perform a method of issuing a digitally-signed assertion, the method comprising:
receiving user data;
computing a digital signature on the user data and a nonce;
separating the user data into a private component and a non-private component, wherein the separating comprises:
determining, based on a size of an area, an amount of the user data that can be encoded in the area; and
selecting, from the user data, data for the private component based on the determined amount and a categorization of the data;
encoding the private component and the nonce in the area as a barcode;
separately storing the non-private component and the digital signature in a database; and
generating a user certificate comprising the barcode and a pointer to the non-private component in the database.

20. The computer program product of claim 19, wherein the issuing further comprises generating the pointer by hashing the private component or a subset of the private component.

* * * * *